Sept. 17, 1968   D. G. McCRACKEN   3,401,956
SWIVEL JOINTS
Filed Oct. 21, 1965

INVENTOR
DONALD G. McCRACKEN

BY *Jerry K. Harness*

ATTORNEY

United States Patent Office 3,401,956
Patented Sept. 17, 1968

3,401,956
SWIVEL JOINTS
Donald G. McCracken, McHenry, Ill., assignor to
Aeroquip Corporation, Jackson, Mich.
Filed Oct. 21, 1965, Ser. No. 499,683
1 Claim. (Cl. 285—190)

ABSTRACT OF THE DISCLOSURE

A fluid conducting balanced pressure swivel joint of low cost design including nonmetallic bearing devices disposed on the unpressurized sides of the joint seals. The use of the inexpensive nonmetal bearing devices is permitted due to the balanced pressure design which eliminates end loading on the bearing devices caused by fluid under pressure in the joint.

---

The invention pertains to a fluid-conducting joint and particularly relates to a joint of the swivel or rotary type.

To establish fluid communication with a rotating or swiveling member, it is necessary to use a swivel or rotary type joint which includes a sleeve member normally affixed to the rotating element concentric with the axis of rotation or swiveling.

A casing member is rotatably mounted upon the joint sleeve and appropriate sealing means seal the sleeve and casing relative to each other. Communicating passages defined in the sleeve and casing established a fluid circuit through these components regardless of the angular relationship of the sleeve and casing.

Swivel or rotary joints often include bearing means interposed between the casing and sleeve and the assembly of the casing and sleeve is usually accomplished through a washer and cotter key arrangement supported on the sleeve, or a threaded extension is provided on the sleeve which receives a nut which bears against the casing and positions the casing upon the sleeve.

It is an object of the invention to provide a swivel joint of economical construction wherein low-cost bearing means are interposed between the casing and sleeve, and the bearing means also function to maintain the assembly of the casing and sleeve components, thereby eliminating the necessity for additional assembly retaining means.

Another object of the invention is to provide a low-cost swivel joint capable of withstanding relatively high bending moment forces imposed upon the casing without causing binding of the casing upon the sleeve, and wherein bearing means insures the rotation of the casing upon the sleeve even when the casing is under a bending moment.

A further object of the invention is to provide a low-cost swivel joint utilizing a minimum amount of material which is easy to assemble and employs bearing means formed of a synthetic material interposed between the casing and sleeve.

More particularly the present invention relates to a balanced pressure swivel joint which is provided with opposed O-ring seals on opposite sides of the fluid path between the casing and the sleeve. The joint is also provided adjacent one O-ring seal with facing grooves that receive a plurality of non-metallic plastic balls which not only act as a bearing but also provide a positioning means for the two relatively rotatable parts. Another bearing in the form of a cylindrical plastic sleeve is provided adjacent the other O-ring on the nonpressurized side thereof.

Figure 1:
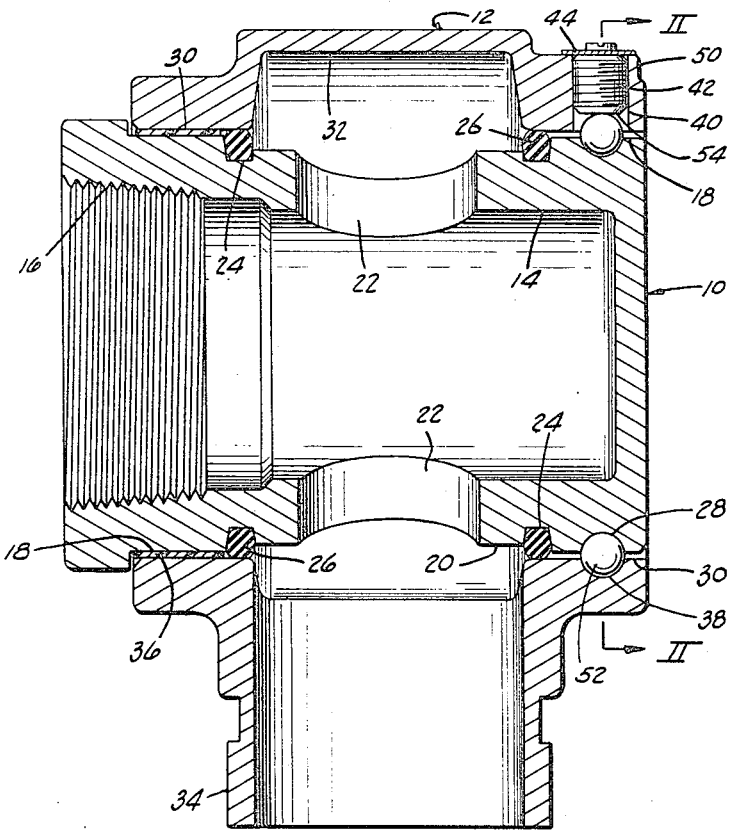
Figure 2:
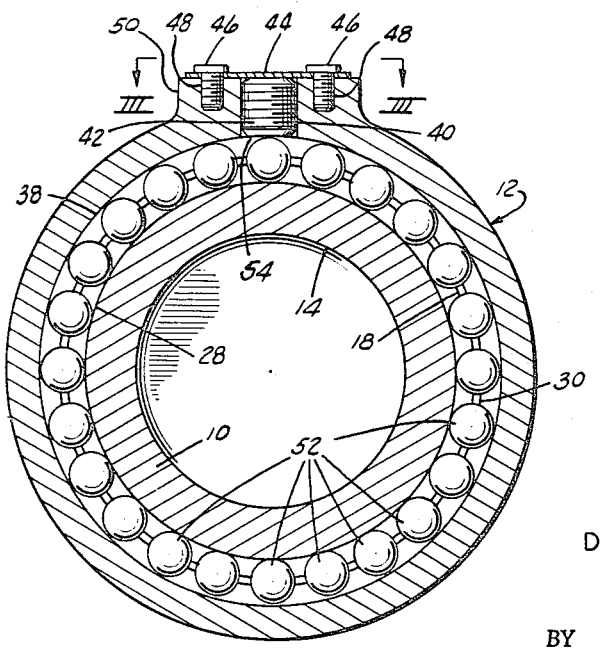
Figure 3:
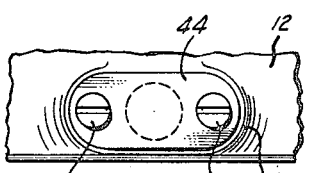

These and other objects of the invention arising from the details and relationships of the components of an embodiment thereof will be apparent from the following description and accompanying drawings wherein:

FIG. 1 is a diametrical, elevational, sectional view of an assembled swivel joint in accord with the invention, FIG. 2 is a transverse, sectional, elevational view illustrating the antifriction bearing means as taken along section II—II of FIG. 1, and FIG. 3 is a detail, plan view of the casing opening cover as taken along section III—III of FIG. 2.

The swivel joint embodiment illustrated in the drawings is of the balanced pressure type and basically consists of a sleeve 10 having a casing 12 rotatably mounted thereon. The sleeve 10 is provided with an internal axially extending bore or passage 14 formed with threads 16 at its open end for attachment of the sleeve to a pipe fitting of a swiveling or rotating member. The sleeve 10 is formed with an exterior cylindrical surface 18 which is recessed at 20 and radial ports 22 communicate with the internal bore 14 and the recess 20. Annular grooves 24 are defined in the casing for receiving sealing O-rings 26. The sleeve 10 is provided with a circular groove 28 defined in the surface 18 adjacent the closed end of the sleeve. The cross-sectional configuration of the groove 28 is semicircular, as will be apparent from FIG. 1. The groove 28 is preferably concentric with the axis of the bore 14 and is concentric with the cylindrical surface 18.

The casing 12 is of an annular configuration and includes an internal, cylindrical surface 30 of a diametrical dimension slightly larger than the cylindrical sleeve surface 18. The casing 12 is internally provided with an annular passage 32 which communicates with a passaged stem 34. A hose line, pipe or other conduit, not shown, may be attached to the stem 34. It will, therefore, be appreciated that fluid communication is established between the sleeve bore 14 and the casing stem 34.

The O-rings 26 sealingly engage the casing surface 30 to prevent the escape of fluid from the joint. To facilitate rotation of the casing 12 relative to the sleeve 10, an annular nylon sleeve-type bearing 36 is interposed between the sleeve cylindrical surface 14 and the casing cylindrical surface 30 at the left end of the fitting, as viewed in FIG. 1. The self-lubricating bearing characteristics of nylon are well known, and this material is capable of providing an effective bearing which will maintain rotation of the casing upon the sleeve even though a relatively high bending moment may be applied to the casing.

At the right end of the casing 12, FIG. 1, the casing is provided with a circular groove 38 concentric to the casing surface 20 and the axis of rotation of the casing upon the sleeve. The circular groove 38 is adapted to be in directly opposed radial relationship to the sleeve groove 28 when the sleeve and casing are properly axially aligned.

A radially disposed threaded opening 40 is defined in the casing 12 in axial alignment with the groove 38. A threaded ball-retainer plug 42 is adapted to be received within the opening 40, and a cover plate 44 is placed over the opening 40 and held in place by screw fasteners 46 threaded into threaded holes 48 defined in the casing boss 50.

A plurality of nylon ball bearings 52 are received within the substantially circular, cross section chamber defined by the grooves 28 and 38, FIG. 2. The balls 52 engage the surfaces defining the grooves and function as ball bearings with regard to rotatably mounting the casing upon the sleeve, As will be apparent from FIGS. 1 and 2, the lower surface 54 of the plug is in alignment with the portion of groove 38 having the greatest radial dimension and, therefore, the opening 40 does not interfere with the movement of the balls 52 about the grooves 28 and 38 as the casing rotates on the sleeve.

In addition to functioning as ball bearings in the normal sense, the balls 52 also axially position the casing 12 upon the sleeve 10. Thus, the need for the more conventional cotter pin or threaded extension retainer means is eliminated. As the grooves 28 and 38 are directly defined in the material of the sleevs and casing, respectively, the requirement for expensive bearing races is eliminated, and the number of compenents of the joint is kept to a minimum.

Assembly of the joint is readily achieved by placing the O-rings 26 within their proper grooves 24 and positioning the bearing 36 upon the sleeve surface 18. The casing 12 is then slid over the sleeve until the groove 38 aligns with the sleeve groove 28. The balls 52 are then dropped into the aligned grooves through the opening 40. After the proper number of balls have been located in the grooves, the plug 42 is threaded into the opening 40 and the cover plate 44 and fasteners 46 put in place. The joint is now fully assembled and operational.

It is appreciated that various modifications to the inventive concept may be apparent to those skilled in the art without departing from the spirit and scope thereof, and it is intended that the invention be defined only by the scope of the following claim:

1. A fluid-conducting balanced pressure swivel joint comprising in combination,
    (a) a sleeve having an axially extending bore defined therein,
    (b) a radially extending port defined in said sleeve communicating with said bore,
    (c) an annular casing rotatably mounted on said sleeve for rotation about said bore,
    (d) a passage defined in said casing in communication with said port,
    (e) first and second spaced seal means disposed on opposite sides of said port and providing fluid seals between said sleeve and said casing.
    (f) a first circular groove defined in said sleeve coaxial wtih the axis of rotation of said casing and disposed at a location wherein one of said seal means is located between said first groove and said port,
    (g) a second circular groove defined in said casing coaxial with the axis of rotation thereof and axially aligned in opposed relation to said first groove,
    (h) first bearing means comprising a plurality of ball elements of a nonmetallic synthetic material received within and engaging the surfaces of said grooves facilitating rotation of said casing upon said sleeve and axially positioning said casing upon said sleeve against axil movement relative thereto,
    (i) second bearing means comprising an annular cylindrical nonmetallic sleeve interposed between said sleeve and said casing at a location adjacent the other of said seal means on the side of said other seal means remote from said port,
    (j) the combined axial length of said second bearing means and adjacent seal being at least equal to the axial length of the portion of the casing from said passage to the adjacent terminal end of said casing, and
    (k) said sleeve having third and fourth circular grooves therein on each side of said port and said first and second seal means being O-rings positioned in said grooves.

References Cited

UNITED STATES PATENTS

| 1,712,130 | 5/1929 | Battenfeld | 285—190 |
| 1,908,844 | 5/1933 | Holtson | 285—276 |
| 3,002,769 | 10/1961 | Deubler et al. | 285—190 X |
| 3,011,803 | 12/1961 | Buckner et al. | 285—276 X |
| 3,088,759 | 5/1963 | Corsette | 285—190 |
| 3,089,221 | 5/1963 | Barr. | |
| 3,143,758 | 8/1964 | Dunham. | |
| 3,148,897 | 9/1964 | Hurt et al. | 285—81 X |
| 3,264,006 | 8/1966 | Downs | 285—276 X |
| 3,290,068 | 12/1966 | Jackson | 285—276 |

FOREIGN PATENTS

| 165,839 | 10/1955 | Australia. |
| 871,052 | 6/1961 | Great Britain. |

CARL W. TOMLIN, *Primary Examiner.*

D. W. AROLA, *Assistant Examiner.*